United States Patent
Liu et al.

(10) Patent No.: US 12,368,675 B2
(45) Date of Patent: Jul. 22, 2025

(54) QUANTIZED PAUSE FOR A TRAFFIC CONTROL MECHANISM ROBUST TO UNDERLYING NETWORK CONDITIONS

(71) Applicant: Clockwork Systems, Inc., Palo Alto, CA (US)

(72) Inventors: Shiyu Liu, Palo Alto, CA (US); Balaji S. Prabhakar, Palo Alto, CA (US)

(73) Assignee: Clockwork Systems, Inc., Palo Alto, CA (US)

( * ) Notice: Subject to any disclaimer, the term of this patent is extended or adjusted under 35 U.S.C. 154(b) by 3 days.

(21) Appl. No.: 18/487,686

(22) Filed: Oct. 16, 2023

(65) Prior Publication Data

US 2024/0137321 A1 Apr. 25, 2024
US 2024/0236004 A9 Jul. 11, 2024

Related U.S. Application Data

(60) Provisional application No. 63/419,271, filed on Oct. 25, 2022.

(51) Int. Cl.
*H04L 47/20* (2022.01)
*H04L 43/0852* (2022.01)
*H04L 47/25* (2022.01)

(52) U.S. Cl.
CPC .......... *H04L 47/20* (2013.01); *H04L 43/0858* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 9,363,181 B1 * | 6/2016 | Nachum | H04L 47/12 |
| 9,407,565 B1 * | 8/2016 | Li | H04L 47/266 |
| 10,623,173 B1 | 4/2020 | Geng et al. | |
| 10,917,229 B2 | 2/2021 | Geng et al. | |
| 11,133,919 B2 | 9/2021 | Geng et al. | |
| 11,258,719 B1 * | 2/2022 | Sommers | H04L 47/2466 |

(Continued)

FOREIGN PATENT DOCUMENTS

WO   WO-2016128931 A1 *   8/2016   ........... H04L 41/147

OTHER PUBLICATIONS

PCT International Search Report and Written Opinion, PCT Application No. PCT/US2023/76984, Mar. 5, 2024, 5 pages.

*Primary Examiner* — Phyllis A Book
(74) *Attorney, Agent, or Firm* — Fenwick & West LLP

(57) ABSTRACT

An application determines conditions of the network between a sender host and a receiver host. The application determines, from the conditions, a length of pause to apply. The application transmits the traffic until the length of pause is completely applied to the network using a series of quantized pauses. When the length of pause exceeds a threshold, the application instructs the sender host to pause the traffic for a first amount of time, and where the length of pause does not exceed the threshold, the application instructs the sender host to pause the traffic for a second smaller amount of time. The application detects a new set of conditions of the network between the first node and the second node, and applies a new series of quantized pauses to transmission of the traffic based on a new length of pause determined from the new set of conditions.

17 Claims, 13 Drawing Sheets

(56) References Cited

U.S. PATENT DOCUMENTS

| | | | | |
|---|---|---|---|---|
| 2003/0128664 A1* | 7/2003 | Connor | .................. | H04L 47/13 |
| | | | | 370/232 |
| 2008/0225842 A1* | 9/2008 | Goldfein | .............. | H04L 1/1825 |
| | | | | 370/389 |
| 2011/0310735 A1* | 12/2011 | Karagiannis | ............ | H04L 47/20 |
| | | | | 370/232 |
| 2019/0379591 A1* | 12/2019 | Boughzala | ............ | H04L 47/115 |
| 2020/0280518 A1* | 9/2020 | Lee | ........................ | H04L 47/115 |
| 2020/0366608 A1* | 11/2020 | Pan | ........................ | H04W 52/26 |
| 2020/0396167 A1* | 12/2020 | Taheri | ...................... | H04L 47/30 |
| 2022/0103479 A1* | 3/2022 | Yebenes Segura | ..... | H04L 47/25 |
| 2022/0124035 A1* | 4/2022 | Lee | ..................... | H04L 43/0882 |
| 2022/0210075 A1* | 6/2022 | Musleh | ................. | H04L 47/122 |
| 2023/0028941 A1* | 1/2023 | Gavino | ................. | H04L 47/215 |
| 2023/0038307 A1* | 2/2023 | Blendin | ................ | H04L 47/125 |

* cited by examiner

1300:

```
┌─────────────────────────────────────────────────────┐
│ Determine a set of conditions of the network        │──── 1310
│ between a sender host and a receiver host           │
└─────────────────────────────────────────────────────┘
                          ▼
┌─────────────────────────────────────────────────────┐
│ Determine, from the set of conditions, a length of  │──── 1320
│ pause to apply to the traffic                       │
└─────────────────────────────────────────────────────┘
                          ▼
┌─────────────────────────────────────────────────────┐
│ Transmit the traffic until the length of pause is   │
│ completely applied to the network using a series of │
│ quantized pauses by: comparing the length of pause  │
│ to a threshold, in response to determining that     │──── 1330
│ the length of pause exceeds the threshold,          │
│ instructing the sender host to pause the traffic    │
│ for a first amount of time; and in response to      │
│ determining that the length of pause does not       │
│ exceed the threshold, instructing the sender host   │
│ to pause the traffic for a second amount of time    │
│ smaller than the first amount of time               │
└─────────────────────────────────────────────────────┘
                          ▼
┌─────────────────────────────────────────────────────┐
│ Detect a new set of conditions of the network       │──── 1340
│ between the sender host and the receiver host       │
└─────────────────────────────────────────────────────┘
                          ▼
┌─────────────────────────────────────────────────────┐
│ Apply a new series of quantized pauses to           │
│ transmission of the traffic based on a new length   │──── 1350
│ of pause determined from the new set of conditions  │
└─────────────────────────────────────────────────────┘
```

FIG. 13 ced for short range communication, but suffer limitations over long range links. For example, trans-continental communi-

QUANTIZED PAUSE FOR A TRAFFIC CONTROL MECHANISM ROBUST TO UNDERLYING NETWORK CONDITIONS

CROSS REFERENCE TO RELATED APPLICATIONS

This application claims the benefit of U.S. Provisional Application No. 63/419,271, filed Oct. 25, 2022, the disclosure of which is hereby incorporated by reference herein in its entirety.

TECHNICAL FIELD

This disclosure relates generally to network transmissions and coordinated control of network traffic within data flows.

BACKGROUND

Existing control systems for network traffic are adequate for short range communication, but suffer limitations over long range links. For example, trans-continental communication between data centers in the United States, or cross-continental communication between data centers housed in the United States and Europe, are subject to lag in control using existing control means. One reason for these limitations is that long range links are controlled using switching protocols that switch across paths, such as Multi-Protocol Label Switching (MPLS). MPLS switches traffic across many paths, and these paths may have different latencies. For example, a given path may have a 23 ms delay west coast to east coast. The delay for this path may be estimated correctly using existing control mechanisms, but MPLS may then move traffic to another path that has a longer lag (e.g., 24 ms), and suddenly the control mechanism may fail or be subject to limitations. Where the 23 ms delay was correctly estimated and controlled for on a 10 g pipe, all 10 g would be useable. When the path switches (e.g., to a 24 ms delay), the control mechanism may only yield less than 5 g.

BRIEF DESCRIPTION OF THE DRAWINGS

FIG. 13 is a flowchart that illustrates an exemplary process for deploying quantized pauses in connection with netcam activities on long-range links, in accordance with an embodiment of the disclosure.

DETAILED DESCRIPTION

Figure 1:
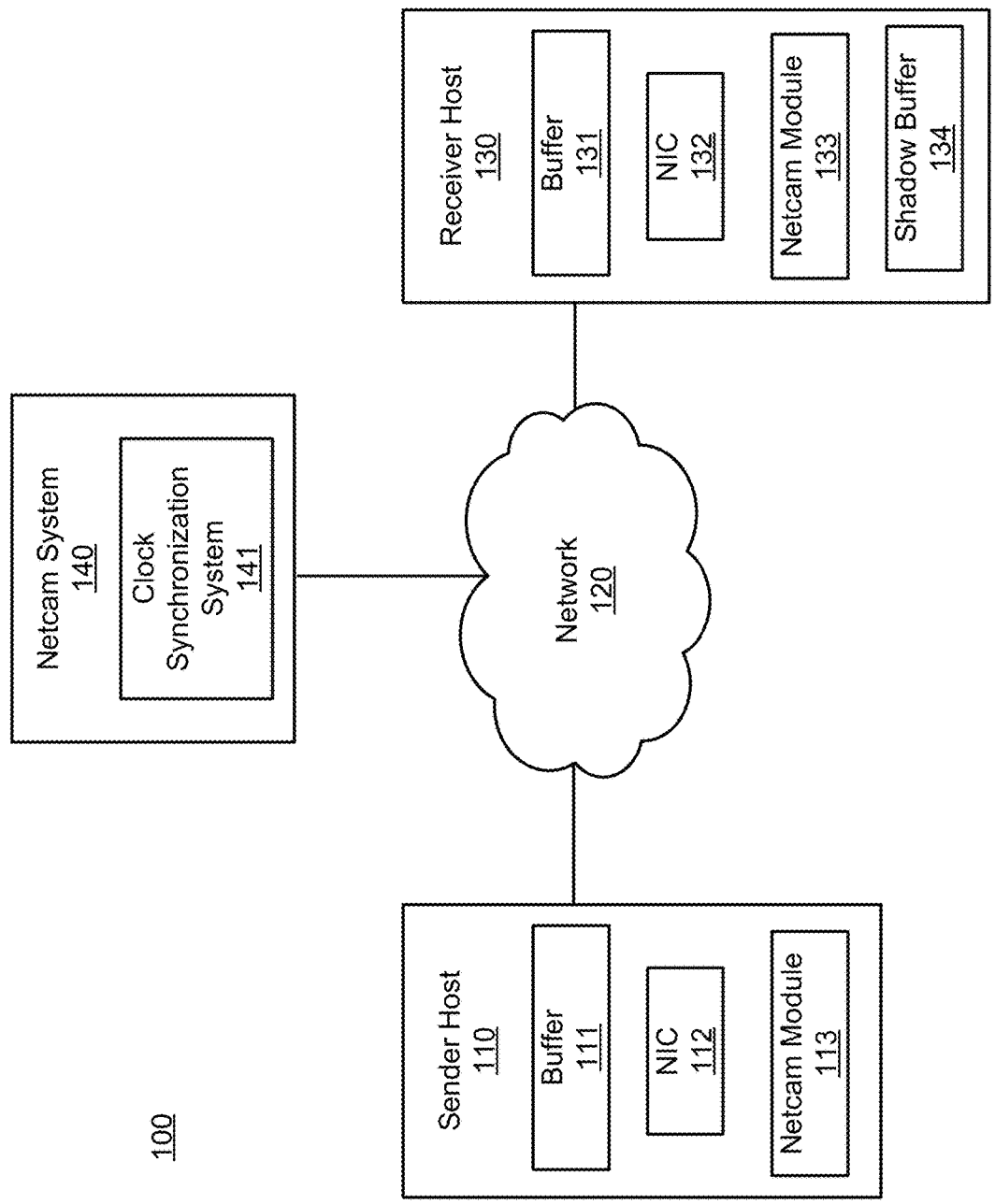
FIG. 1 is an exemplary system environment for implementing netcam and priority functions, according to an embodiment of the disclosure.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Systems and methods are disclosed herein for coordinating control of data flows in the face of transient congestion. A "netcam" monitors network traffic between clock-synchronized sender and receiver hosts that are part of a data flow. The term "netcam" as used herein, is a term that is short for "network camera," and is a module that tracks network traffic and ensures remedial action is taken where traffic of a data flow in clock-synchronized systems lags beyond tolerable limits. The netcam instructs sender and receiver hosts to buffer copies of network traffic according to some parameter (e.g., buffer a certain number of packets, buffer packets for a rolling window of time, etc.). Buffers may be overwritten on a rolling basis where the parameter is achieved (e.g., overwrite oldest packet when new packet is transmitted or received and when buffer is full). The netcam may have all sender and receiver hosts write buffer data where an anomaly is detected, and may have the sender hosts re-transmit the written packets. The re-transmission may be subject to jitter (e.g., a time delay between packet transmissions of the data flow), such that where transmission delay or failure occurred due to a given sequence of packet transmission, the jitter causes enough change to nonetheless have the re-transmission attempt succeed. The netcam may determine a need to write and re-transmit packets differently depending on a priority of a data flow. The netcam may instruct shadow buffers at receiver hosts to monitor path usage and capacity, where high usage and/or low capacity may cause the netcam to predict an upcoming anomaly and take remedial action similar to that taken where a buffer is full.

Advantageously, the netcam implementations disclosed herein enable both improved network transmissions and forensic analysis. The improved network transmissions occur in that writing latest packet transmission attempts to buffers across all machines in a data flow enable re-transmission of an exact set of packets from many machines without reliance on acknowledgment packets that may get lost or dropped across a complex web of machines. Moreover, virtual machines may have bugs that are difficult to detect or isolate. Writing packet sequences associated with an anomaly enables failure analysis, which may enable identification of a faulty virtual machine. Yet further, using shadow buffers to predict anomalies may prevent a scenario where traffic becomes over-congested, enabling remedial action to occur while some capacity remains on a path and without pausing traffic. Additional advantages and improvements are apparent from the disclosure below.

In some embodiments, where control mechanisms are used, it is determined that network traffic is to be paused for a certain amount of time, an amount of pause given a certain set of detected network conditions is determined, and that entire amount of pause is applied at once, after which new network conditions are again determined, and pause is again applied as needed. This works on short range links, because those short-range links have roughly constant network conditions. Long pauses, however, can cause loss of usable bandwidth. For example, if during a pause (e.g., of 3.2 milliseconds), an MPLS network controller switches a path of the paused traffic link and the switched path has a different latency, then the pause is applied to a link for which it is not tuned, which creates bandwidth inefficiencies.

In an embodiment, to address these inefficiencies, the system may determine a set of conditions of the network between a first node and a second node. For example, one-way delay may be calculated between the nodes. The system may then determine, from the set of conditions, a length of pause to apply to the traffic. The system may then transmit the traffic unit-by-unit until the length of pause is completely applied to the network using a series of pauses. Each pause in this series of pauses is a "quantized pause". In an embodiment, this transmission may be performed by comparing the length of pause to a threshold. Responsive to determining that the length of pause exceeds the threshold, the system may instruct the first node to pause the traffic for a first amount of time. Responsive to determining that the length of pause does not exceed the threshold, the system may instruct the first node to pause the traffic for a second amount of time smaller than the first amount of time. This may be repeated until the length of pause is completely applied, after which network conditions are reassessed by the system and a new length of pause is determined. Alternatively, the system may assess network conditions after a given pause of the series of pauses, and may re-determine the length of pause based on those updated network conditions.

In an embodiment, between each pause of the series of pauses, a unit of traffic is transmitted. The unit may include a same amount of data to be transmitted after each pause before a next pause. Following each given pause of the series of pauses, a next unit of traffic may be transmitted without reliance on receipt of an acknowledgement packet from the second node for a prior unit of traffic that was transmitted prior to the given pause. Further details of such embodiment are described below.

FIG. 1 is an exemplary system environment for implementing netcam and priority functions, according to an embodiment of the disclosure. As depicted in FIG. 1, netcam environment 100 includes sender host 110, network 120, receiver host 130, and clock synchronization system 140. While only one of each of sender host 110 and receiver host 130 is depicted, this is merely for convenience and ease of depiction, and any number of sender hosts and receiver hosts may be part of netcam environment 100.

Sender host 110 includes buffer 111, Network Interface Card (NIC) 112, and netcam module 113. Buffer 111 stores a copy of outbound data transmissions until one or more criteria for overwriting or discarding packets from the buffer is met. For example, the buffer may store data packets until it is at capacity, at which time the oldest buffered data packet may be discarded or overwritten. Other criteria may include a time lapse (e.g., discard packets after predetermined amount of time has elapsed from its transmission timestamp), an amount of packets buffered (e.g., after a predetermined amount of packets are buffered, begin to discard or overwrite oldest packet as new packets are transmitted), and the like.

In an embodiment, buffer 111 stores information relating to given outbound transmissions, rather than entire packets. For example, a byte stamp may be stored rather than the packet itself, the byte stamp indicating an identifier of the packet and/or flow identifier and a time stamp at which the packet (or aggregate data flow) was sent. In such an embodiment, the stored information need not be overwritten, and may be stored to persistent memory of sender host 110 and/or clock synchronization system 140. This embodiment is not mutually exclusive to buffer 111 storing copies of packets, and they may be employed in combination.

NIC 112 may be any kind of network interface card, such as a smart NIC. NIC 112 interfaces sender host 110 and network 120.

Netcam module 113 monitors data flow for certain conditions, and triggers functionality based on the monitored data. As an example, netcam module 113 may, responsive to detecting network congestion, instruct all hosts that are part of a data flow to perform one or more of various activities, such as pausing transmissions, taking a snapshot of buffered data transmissions (that is, writing buffered data packets to persistent memory), and performing other coordinated activity. As used herein, the term data flow may refer to a collection of data transmissions between two or more hosts that are associated with one another. Further details of netcam module 113 are described in further detail with respect to FIGS. 2-8 below. Netcam module 113 may be implemented in any component of sender host 110. In an embodiment, netcam module 113 may be implemented within NIC 112. In another embodiment, netcam module 113 may be implemented within a kernel of sender host 110.

Network 120 may be any network, such as a wide area network, a local area network, the Internet, or any other conduit of data transmission between sender host 110 and receiver host 130. In some embodiments, network 120 may be within a data center housing both sender host 110 and receiver host 130. In other embodiments, network 120 may facilitate cross-data center transmissions over any distance. The mention of data centers is merely exemplary, and sender host 110 and receiver host 130 may be implemented in any medium including those that are not data centers.

Receiver host 130 includes netcam buffer 131, NIC 132, netcam module 133, and shadow buffer 134. Netcam buffer 131, NIC 132, and netcam module 133 operate in similar manners to the analog components described above with respect to sender host 110. Buffer 131 may be a same size or a different size from buffer 111, and may additionally or alternatively store byte stamps for received packets. Any further distinctions between these components as implemented in sender versus receiver host will be apparent based on the disclosure of FIGS. 2-8 below.

Shadow buffer 134 may be used for tracking data traffic in a manner that enables an early warning of when congestion is likely to come. For example, as data traffic is buffered, congestion may occur when the buffer is full, the congestion preventing further data traffic from flowing until the congestion is cleared. A shadow buffer may increment a counter more quickly than regular buffer (e.g., increment by 1.1 where 1 unit of data is received at a regular buffer), and/or may decrement the counter more slowly than a regular buffer (e.g., decrement by 0.9 or 0.95 where 1 unit of data is cleared at the regular buffer). The term regular buffer, as used herein, may refer to activity of buffers 111 and/or buffer 131 and/or other buffers disclosed herein having similar functionality to that of buffers 111 and/or 131. While only one shadow buffer 134 is depicted in FIG. 1, multiple shadow buffers may be employed at receiver hosts, and each shadow buffer may be allocated to a different subset of data flows, such as data flows each corresponding to a same application. The shadow buffers may increment/decrement at different rates (e.g., to show more congestion for lower priority applications, and to show less congestion for higher priority applications). Alternatively, the shadow buffers may increment/decrement at same rates, but different thresholding may be applied for different applications as to when a data flow should be considered to be facing congestion. Data buffered in a regular buffer includes data traffic (e.g., network packets) received by a receiver; the data is removed from the regular buffer as the data is processed and/or routed to a next destination. Activity described herein of netcam module 113 and/or netcam system 140 taking action with respect to conditions being met with respect to regular buffers may equally be performed where shadow buffer 134 indicates congestion.

Netcam system 140 includes clock synchronization system 141. Netcam system 140 may monitor data observed by the netcam modules implemented in hosts, such as netcam module 131 and 133. Netcam system 140 may detect conditions that require action by the netcam modules and may transmit instructions to affected netcam modules to take coordinated action for a given data flow. Clock synchronization system 141 synchronizes one or more components of each host, such as the NIC, the kernel, or any other component within which the netcam modules act. Details of clock-synchronization are described in commonly-owned U.S. Pat. No. 10,623,173, issued Apr. 14, 2020, the disclosure of which is hereby incorporated by reference herein in its entirety. Each host is synchronized to an extremely precise degree to a same reference clock, enabling precise timestamping across hosts regardless of host location, bandwidth conditions of the host, jitter, and the like. Further details of netcam system 140 are disclosed below with reference to FIGS. 2-8. Netcam system 140 is an optional component of netcam environment 100, and the netcam modules of the sender and/or receiver hosts can operate netcam modules without reliance on a centralized system, other than reliance on a reference clock with which to synchronize.

There are many advantages of netcam environment 100. The netcam modules are edge-based, given that they can run in the kernel or in NICs (e.g., smart NICs) of a host (e.g., physical host, virtual machine, or any other form of host). In an embodiment, the netcam functionality may run as an underlay, meaning that it may run, e.g., as a shim, on a layer of the OSI system under a congestion control layer (e.g., layer 3 of the OSI system). The netcam modules and/or netcam system 140 may instruct hosts to perform activity upon detection of a condition (e.g., a congestion signal is detected using a shadow buffer), such as pausing transmission of a data flow across affected hosts, taking a snapshot (that is, writing some or all of the buffered data, such as the last N bytes transmitted and/or the bytes transmitted in the last S seconds, where N or S may be default values or defined by an administrator), and any other activity disclosed herein. Further advantages and functionality are described below with respect to FIGS. 2-8.

Figure 2:
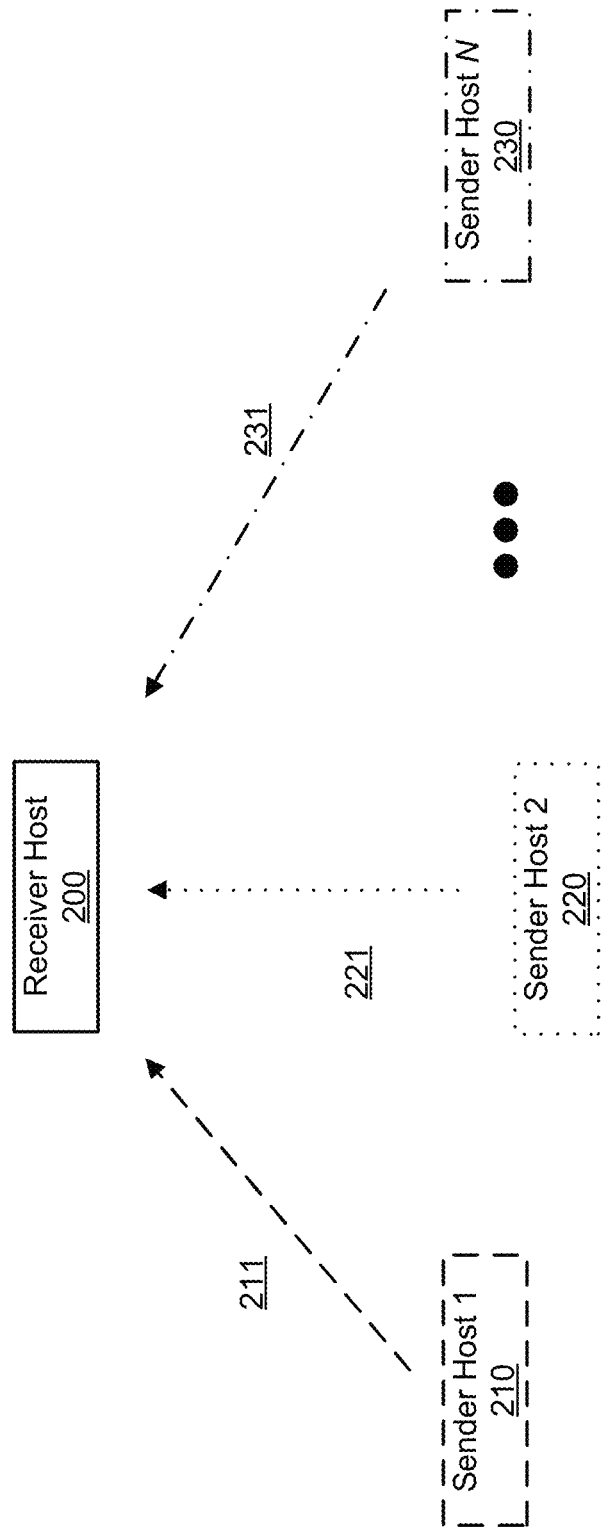
FIG. 2 is a network traffic diagram showing multiple sender hosts sending multiple data flows to a single receiver host, according to an embodiment of the disclosure.

FIG. 2 is a network traffic diagram showing multiple sender hosts sending multiple data flows to a single receiver host, according to an embodiment of the disclosure. As depicted in FIG. 2, sender host 1 is sending data flow 211 to receiver host 200, sender host 220 is sending data flow 221 to receiver host 200, and, represented by sender host 230, any number of additional hosts may be transmitting respective data flows (represented by data flow 231) to receiver host 200. As depicted in FIG. 2, each data flow sent by each sender host is different; however, this is merely for convenience two or more sender hosts may transmit data from the same data flow. Moreover, a single sender host may send two or more different data flows to receiver host 200. While only one receiver host is depicted, sender hosts may transmit data flows to any number of receiver hosts.

Figure 3:
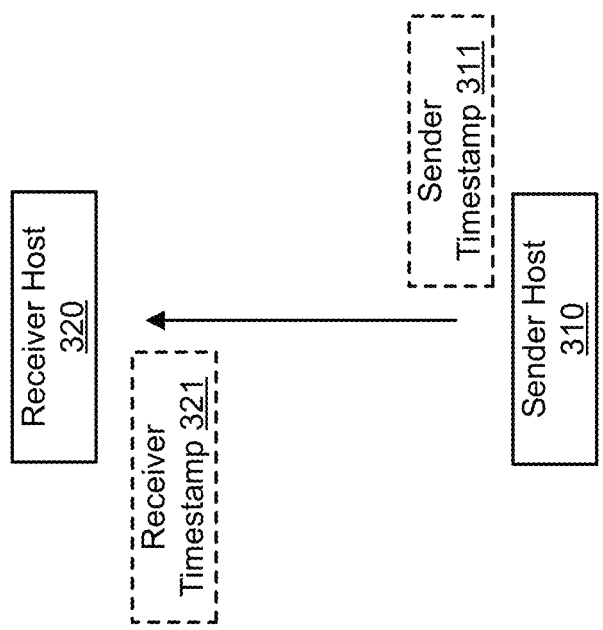
FIG. 3 is a network traffic diagram showing a timestamping operation at both a sender and receiver side of a data transmission, according to an embodiment of the disclosure.

We turn to the moment now to FIG. 3 to discuss operation of netcam modules at sender and receiver hosts. FIG. 3 is a network traffic diagram showing a timestamping operation at both a sender and receiver side of a data transmission, according to an embodiment of the disclosure. As depicted in FIG. 3, when sender host 310 transmits a packet to receiver host 320, netcam module 113 of receiver host 320 records sender timestamp 311. Similarly, when receiver host 320 receives the packet, netcam module 133 of receiver host 320 applies receiver timestamp 321. The timestamp reflects a time at which the data packet was sent or received by the relevant component on which the netcam module is installed (e.g., NIC, kernel, etc.). Sender timestamps may be stored in buffers 111 and 131, appended to packets, transmitted for storage in netcam system 140, or any combination thereof.

Because sender host 310 is synchronized to a same reference clock as receiver host 320, the elapsed time between the time of sender timestamp 311 and receiver timestamp 321 reflects a one-way delay for a given packet. In an embodiment, upon receiving a given packet, receiver host 320 transmits an acknowledgment packet to sender host 310 that indicates receiver timestamp 321, by which netcam module 113 can calculate the one-way delay by subtracting the sender timestamp 311 from the receiver timestamp 321. Other means of calculating the one-way delay are within the scope of this disclosure. For example, the sender timestamp 311 may be appended to the data transmission, and receiver host 320 may thereby calculate the one-way delay without a need for an acknowledgment packet. As yet another example, the netcam modules of sender hosts and receiver hosts may transmit, either in batches or individually, timestamps to netcam system 140, which may calculate one-way delay therefrom. For the sake of convenience and brevity, the scenario where sender host 110 calculates one-way delay based on an acknowledgment packet will be the focus of the following disclosure, though one of ordinary skill in the art would recognize that any of these means of calculation equally apply.

In an embodiment, the netcam system then determines whether the one-way delay exceeds a threshold. For example, after calculating one-way delay, sender host 110 may compare the one-way delay to the threshold. The threshold may be predetermined or dynamically determined. Predetermined thresholds may be set by default or may be set by an administrator. As will be described further below, different thresholds may apply to different data flows depending on one or more attributes of the data flows, such as their priority. The threshold may be dynamically determined depending any number of factors, such as dynamically increasing the threshold as congestion lowers, and decreasing the threshold as congestion rises (e.g., because delay is more likely to be indicative of a problem where congestion is not a cause or is a minor cause). In one embodiment, thresholds may be set on a per-host basis, as they may depend on a distance between a sender host and a receiver host. In such an embodiment, the threshold may be a predefined multiple of a minimum one way delay between a sender and a receiver host. That is, the minimum amount of time by which a packet would need to travel from a sender host to a receiver host would be a minimum one-way delay. The multiple is typically 1.5×-3× the minimum, but may be any multiplier defined by an administrator of the netcam. The threshold is equal to the multiple times the minimum one-way delay. Responsive to determining that the one-way delay exceeds the threshold, netcam module 113 may instruct sender host 110 to take one or more actions.

In an additional or alternative embodiment, determining whether to take one or more actions may be performed using a separate measure of a status of a shadow buffer (e.g., shadow buffer 134). In short (further detail will be described below), during a given data flow, and in parallel with buffering data using a regular buffer, netcam module 133 may instruct shadow buffer 134 be incremented for each unit of data traffic received by receiver host 320. Netcam module 133 may define a dynamic drain rate, which is a rate at which netcam module 133 instructs shadow buffer 134 be decremented. The dynamic drain rate may be determined by netcam module 133 based on a number of units of data removed from buffer 131 per unit of time (e.g., multiplied by a factor that causes drain to occur more slowly in shadow buffer 134 than it occurs in buffer 131). Netcam module 133 may calculate a dwell time as a function of the counter of shadow buffer 134 and the dynamic drain rate (e.g., the dwell time may be calculated by a value of the counter of the shadow buffer divided by the dynamic drain rate). From here, netcam module 133 may determine a one-way delay of the shadow buffer to be the actual one-way delay (determined from the sender and receiver timestamps, described above) as aggregated with the dwell time. The one-way delay of the shadow buffer may be used for comparison against the threshold (in addition to, or instead of, the one-way delay of the regular buffer) to determine whether to take one or more actions.

Whether driven by the regular buffer or the shadow buffer one-way delay, these one or more actions may include pausing transmission from that sender host when one-way delay is high, which reduces congestion and thereby reduces packet drops on network 120 in general. The pause may be for a predetermined amount of time, or may be dynamically determined proportionally to the magnitude of the one-way delay. In an embodiment, the pause may be equal to the one-way delay or may be determined by applying an administrator-defined multiplier to the one-way delay. In an embodiment, the netcam determines whether a prior pause is being enforced, and if so, may reduce the pause time based on a prior amount of pause time that has already elapsed from previously acknowledged packets. Moreover, a given data flow may not be the only data flow contributing to congestion, and thus its pause duration may be smaller than the one-way delay or the one-way delay threshold.

Another action that may be taken is to write some or all buffered data packets (e.g., from either or both of the sender host and receiver host) to persistent memory responsive to the one-way delay exceeding the threshold. Diagnosis may then be performed on the buffered data packets (e.g., to identify network problems). Further actions are described with respect to FIGS. 4-8 in further detail below.

In some embodiments, data flows may be associated with different priorities. Netcam modules may determine priority of data flows either based on an explicit identifier (e.g., an identifier of a tier of traffic within a data packet header), or based on inference (e.g., based on heuristics where rules are applied to packet header and/or payload to determine priority type). Priority, as used herein, refers to a precedence scheme for which types of data packets should be allowed to be transmitted, and which should be paused, during times of congestion. The priorities disclosed herein avoid a need for underutilizing a link or making explicit allocations of bandwidth, and instead are considered in the context of choosing what packets to transmit during network congestion.

In order to prioritize high priority packets, a high one-way threshold may be assigned to high priority traffic, and a low, relative to the high one-way threshold, may be assigned to the low priority traffic. These thresholds may be used for comparison against either, or both of, a shadow buffer one-way delay and/or a regular buffer one-way delay. In this manner, low priority packets will have anomalies detected more frequently than high priority packets, because a lower one-way delay is required to be detected for a low priority packet for an anomaly to be detected by a netcam module, whereas high priority packets will have anomalies detected only when a higher one-way delay threshold has been breached. Following from the above discussion of determining the one-way threshold for a given host, different one-way thresholds may be applied to different data packets that are sent by or received by a same host depending on priority. In priority embodiments, the one-way threshold may be determined in the manner described above (e.g., by applying a predetermined multiplier to the threshold), where the determination is additionally influenced by applying a priority multiplier. The priority multiplier may be set by an administrator for any given type of priority, but will be higher for higher priorities, and lower for lower priorities. Priority need not be binary—any number of priority tiers may be established, each corresponding to a different type or types of data traffic, and each having a different multiplier. Priorities and their associated multipliers may change over time for given data flows (e.g., where a data flow begins transmitting a different type of data packet that does not require high latency transmission, priority may be reduced).

Additionally or alternatively to using a priority multiplier on one-way delay thresholds and differentiating one-way delay thresholds based on priority of a given packet or data flow within which a packet is transmitted, the netcam modules may manipulate the pause time of paused traffic during a pause operation differently depending on priority. A low pause time may be assigned to higher priority traffic, and a relatively high pause time may be assigned to lower priority traffic, ensuring that lower priority traffic is paused more often than high priority traffic during times of congestion, and thereby ensuring that higher priority traffic has more bandwidth available while the lower priority traffic is paused. The pause times may be determined in the same manner as described above, but with the additional step of applying an additional pause multiplier to the pause times, with lower pause multipliers (e.g., multipliers that are less than 1, such as 0.7×) for high priority traffic, and higher pause multipliers (e.g., multipliers that are more than 1) for lower priority traffic.

Priority may be allocated in any number of ways. In an embodiment, one or more "carpool lanes" may be allocated that can be used by data flows having qualifying priorities. For example, a "carpool lane" may be a bandwidth allocation that does not guarantee a minimum bandwidth for a given data communication, but that can only be accessed by data flows satisfying requisite parameters. Exemplary parameters may include one or more priorities that qualify to use the reserved bandwidth of a given "carpool lane." As an example, a carpool lane may require that a data flow has at least a medium priority, and thus both medium and high priorities qualify in a 3-priority system having low, medium, and high priorities. As another example, multiple carpool lanes may exist (e.g., a carpool lane that can only be accessed by high priority traffic in addition to a carpool lane that can be accessed by both medium and high priority traffic).

In an embodiment, guaranteed bandwidth may be allocated to a given priority. For example, a high priority data flow may be allocated a minimum bandwidth, such as 70 mbps. In such an embodiment, excess unused bandwidth from what is guaranteed may be allocated to lower priority data flows until such a time that the bandwidth is demanded by a data flow that qualifies for the guarantee. Guaranteed bandwidth may be absolute or relative. Relative guarantees guarantee that a given priority data flow will receive at least a certain relative amount more bandwidth than a low priority data flow. For example, a high priority data flow may be guaranteed 3× the bandwidth of a low priority data flow, and a medium priority data flow may be guaranteed 2× the bandwidth of a low priority data flow.

Returning to FIG. 2, where two or more sender hosts transmit data from a same data flow, those nodes, in tandem, and in addition to any receiver hosts that are receiving the data from the data flow, may be referred to as a "cluster." In an embodiment, a data flow may be identified by a collection of identifiers that, if all detected, represent that a data packet is part of a data flow. For example, a netcam module of any host may determine a flow identifier that identifies a data flow to which a packet belongs based on a combination of source address, destination address, source port number, destination port number, and protocol port number. Other combinations of identifiers may be used to identify a data flow to which a packet is a part. As stated before, the hosts of the cluster are all clock-synchronized against a same reference clock, no matter their form (e.g., server, virtual machine, smart NIC, etc.).

In a scenario where data flows 211 and 221 are a same data flow, sender host 210, sender host 220, and receiver host 200 form a cluster. Following this example, buffering of data packets (across both regular buffers and shadow buffers) may occur on a per-flow level across a cluster of hosts. That is, one or more netcam modules and/or netcam system 140 may record within buffers of hosts of a data flow all packets transmitted or received within whatever parameter the buffer uses to record and then overwrite data (e.g., most recently transmitted packets, packets transmitted/received within a given amount of time, etc.). Moreover, a receiver node receiving packets of a data flow from multiple sender hosts (e.g., receiver host 200 receiving packets from sender hosts 210 and 220) may maintain a single shadow buffer for the data flow, or may maintain separate shadow buffers, one for each of sender host 210 and sender host 220. In an embodiment, indicia of a timed sequence, relative to the reference clock, is stored with the buffered data (e.g., sender timestamp 311 and/or receiver timestamp 321 is stored with a buffered data packet). Thus, sender host 210 and sender host 220 may store in their buffers 111 data packets that share a given flow ID, and receiver host 200 may store received packets within buffer 131. Alternatively or additionally, transmitted and/or received packets may be transmitted to netcam system 140, which may buffer received data.

Figure 4:
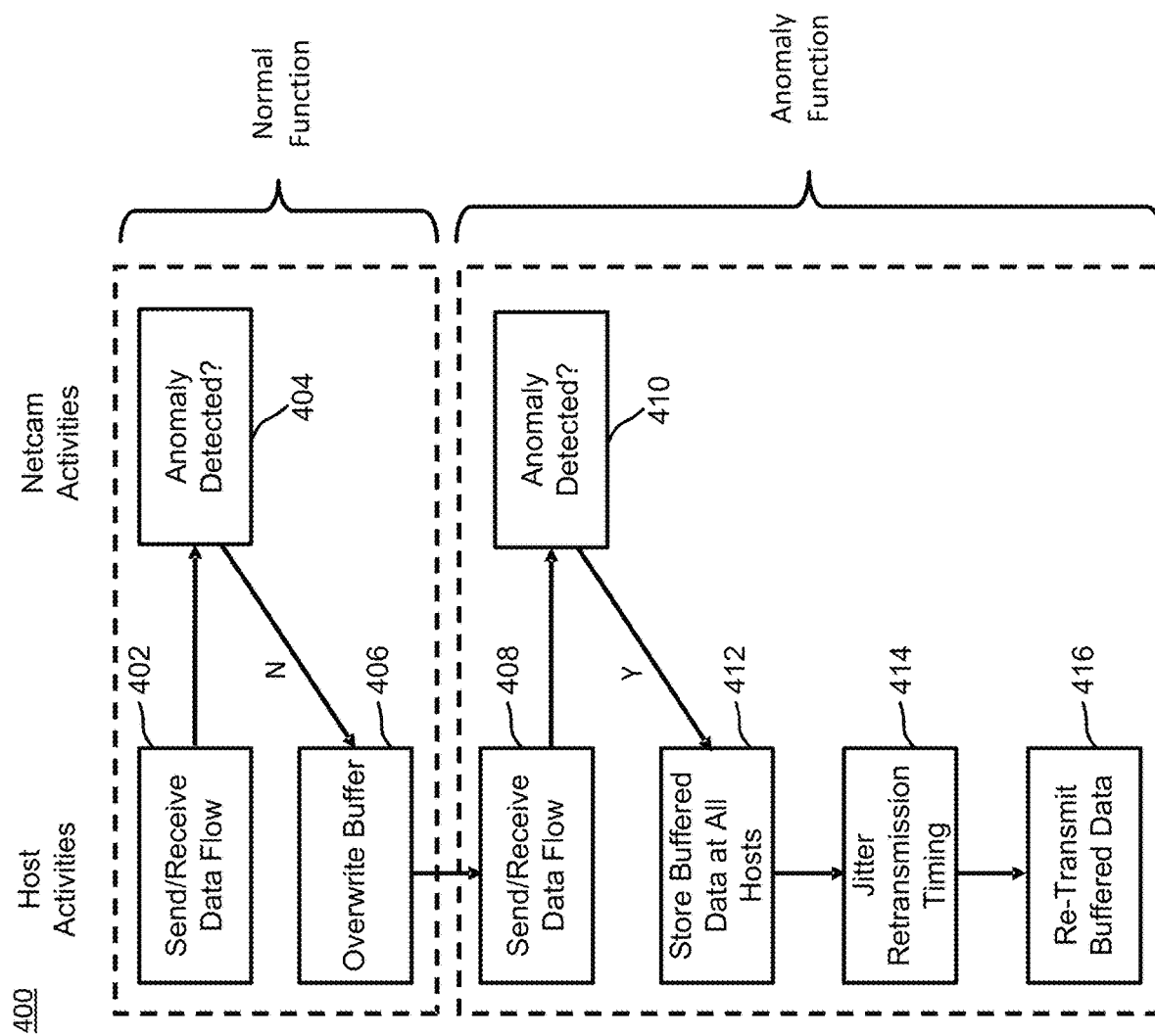
FIG. 4 is a data flow diagram showing netcam activities during normal operation and where an anomaly is detected, according to an embodiment of the disclosure.

From this vantage point of buffering a certain amount of data at each host of a cluster, different functionality of host netcam modules is possible responsive to detection of an anomaly (e.g., the aforementioned conditions mentioned with respect to FIG. 2 above). FIG. 4 is a data flow diagram showing netcam activities during normal operation and where an anomaly is detected, according to an embodiment of the disclosure. Data flow 400 reflects host activities and netcam activities (e.g., activities taken by netcam modules of sender/receiver hosts or netcam system 140) during normal function, and during an "anomaly function" (that is, action taken where an anomaly is detected). Data flow 400 first shows normal function, where hosts send or receive 402 data flows, and the netcam module or system (referred to generally in this figure as "netcam") determines 404 whether an anomaly is detected (e.g., based on one-way delay, as discussed above). Where no anomaly is detected, on the assumption that the buffer is full from prior storage of data packets, the host(s) (e.g., of a cluster) overwrite 406 their buffer(s) (e.g., meaning overwrite oldest packet or follow some other overwrite heuristic as described above). Of course, where buffers are not full, overwriting is not necessary, and storing to a free memory of the buffer occurs. Normal function repeats unless an anomaly is detected.

Anomaly function occurs where an anomaly is detected. Different anomaly functions are disclosed herein, and data flow 400 focuses on illustrating a particular anomaly function of re-transmitting buffered data. Where sending/receiving 408 information of a data flow by hosts (e.g., of a cluster), the netcam may detect 410 an anomaly. As mentioned above, anomalies are detected where one-way delay (e.g., of a shadow buffer and/or of a regular buffer) exceeds a threshold. Recall that for a cluster, the threshold may vary between hosts of the cluster depending on distance between sender and receiver hosts. Responsive to detecting the anomaly, the netcam instructs 412 the buffered data to be stored at all hosts of the cluster. That is, where an anomaly occurs on even one host of a cluster, data from all nodes of the cluster is stored. This may occur by instructing the hosts to store the buffered data (or the portion thereof relating to the data flow) to persistent memory, or by keeping the buffered data within the buffer and pausing data transmissions, or a combination thereof with different instructions for different hosts. Note that where pause is used, pause time may vary across the different nodes of the cluster, as mentioned above. Regardless of how the data is stored, the netcam may jitter 414 retransmission timing. Recall that the timed sequence of packet transmissions and receptions is reflected in the stored data packets. The netcam may jitter 414 the retransmission timing by altering the timed sequence (e.g., creating longer lag between a previous time gap between transmissions, transmitting the packets in a different order, etc.). The jitter may occur according to a heuristic, or may be random. Jitter is applied in case the prior attempted timed sequence was the cause of the failure (e.g., because the prior attempted timed sequence itself may cause too much transient congestion), and thus the jitter may in such a scenario result in a success where re-transmission without jitter would fail. The netcam then re-transmits 416 the buffered data (or portion thereof). Note that it may be more expedient and computationally efficient to re-transmit the entire buffer, including data unrelated to the data flow or the anomaly, rather than isolating the packets of the data flow that relate to the anomaly. Normal function then resumes until another anomaly is detected.

Re-transmission with jitter is only one example of anomaly function, and any number of functions may occur responsive to detection of an anomaly. For example, additionally or alternatively to the anomaly function depicted in data flow 400, the buffered data may be written to persistent memory and stored for forensic analysis. In such a scenario, responsive to detecting an anomaly, the netcam may transmit an alert to an administrator and/or may generate an event log indicative of the anomaly. Any other aforementioned anomaly function is equally applicable. As an example of forensic analysis, a known type of attack on a system such as a data center is a timing attack. Timing attacks may have "signatures," in that an inter-packet spacing of traffic can be learned (e.g., by training a machine learning model using timing patterns as labeled by whether the timing pattern was a timing attack, by using pattern recognition, etc.). Forensic analysis may be performed to determine whether the data was a timing attack. Timing attacks may be blocked (e.g., by dropping data packets from a buffer upon netcam module 113 determining that the buffered data represents a timing attack).

As mentioned above, buffered data may include byte stamps (as opposed to, or in addition to, buffered packets). Byte stamps may be used in analyzing an anomaly (e.g., in forensic analysis, network debugging, security analysis, etc.). An advantage of using byte stamps, rather than buffered data packets, is that storage space is saved, and byte stamps are computationally less expensive to process. Byte stamps for an amount of time corresponding to an anomaly may be analyzed to determine a cause of the anomaly. The trade off in using byte stamps, rather than buffered packets, is that buffered packet data is more robust and may provide further insights into an anomaly.

Figure 5:
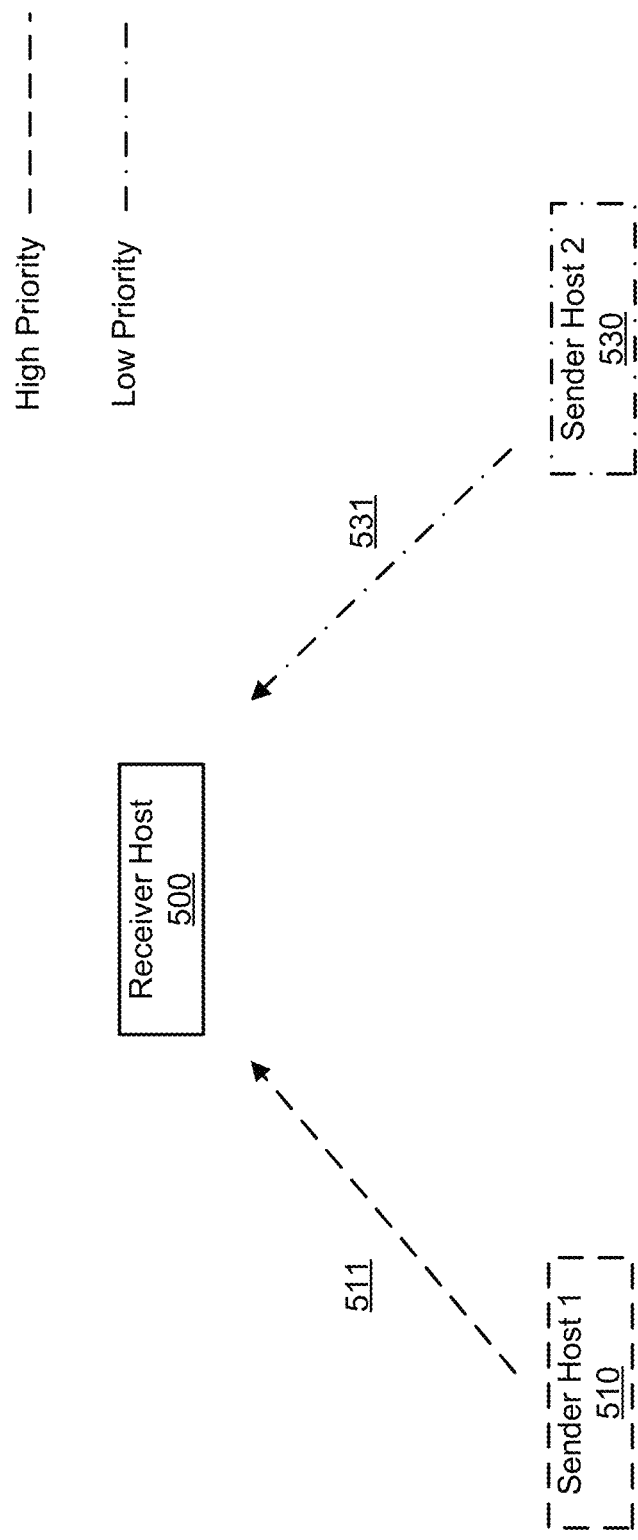
FIG. 5 is a network traffic diagram showing a receiver host receiving both high and low priority traffic from sender hosts, according to an embodiment of the disclosure.

FIG. 5 is a network traffic diagram showing a receiver host receiving both high and low priority traffic from sender hosts, according to an embodiment of the disclosure. As depicted in FIG. 5, sender host 510 transmits high priority data flow 511 to receiver host 500, and sender host 530 transmits low priority data flow 531 to receiver host 500. Where network congestion occurs and an anomaly is detected, the sender hosts may treat the high and low priority traffic differently. In an embodiment, sender host 530 detects network congestion sooner than sender host 510 because low priority data flow 531 is associated with a lower one-way delay threshold than high priority data flow 511. Therefore, sender host 530 may perform remedial action, such as pausing network transmissions of low priority data flow 531, for a pause time, while high priority data flow 511 continues to transmit because its higher one-way delay threshold has not yet been reached. Where high priority data flow 511 does reach its higher one-way delay threshold, and a pause action is responsively taken, that pause time may be lower than the pause time for low priority data flow 531, thus ensuring that high priority data flow 511 resumes sooner and during a time of less congestion than it would face if low priority data flow 531 were not paused for extra time while high priority data flow 511 continued.

Similarly, with respect to shadow buffer operation, a high priority shadow buffer may be separately maintained by receiver host 500 for high priority data flow 511, and a low priority shadow buffer may be separately maintained by receiver host 500 for low priority data flow 531. The drain rate may be weighted differently on the basis of priority. For example, the high priority shadow buffer may have a higher drain rate relative to a drain rate used for the low priority shadow buffer, thus resulting in the high priority shadow buffer being less likely to cause a detection of an anomaly than the low priority shadow buffer.

While depicted as two separate sender hosts, sender hosts 510 and 530 may be a same host, where one sender host transmits both high and low priority traffic to receiver host 500. Thus, a same sender host may take remedial action (e.g., pause) responsive to detecting an anomaly of low priority data flow 531 while continuing to transmit high priority data flow 511 as normal. Sender hosts may have multiple buffers 111, each buffer corresponding to a different priority of data.

Figure 6:
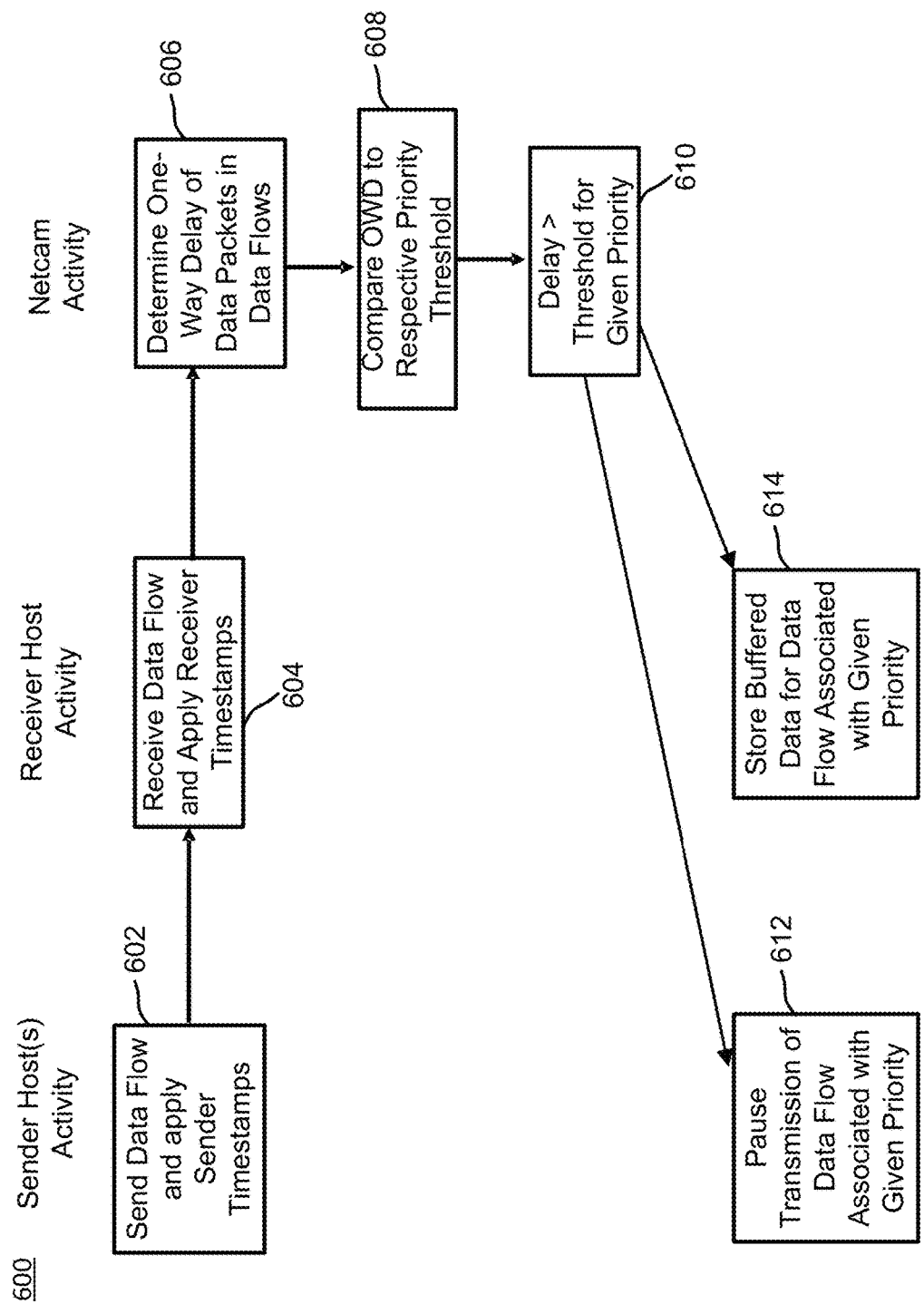
FIG. 6 is a data flow diagram showing netcam activities where priorities are accounted for in determining netcam activity, according to an embodiment of the disclosure.

FIG. 6 is a data flow diagram showing netcam activities where priorities are accounted for in determining netcam activity, according to an embodiment of the disclosure. Data flow 600 begins with one or more sender hosts (e.g., sender host 110) sending 602 a data flow and applying sender timestamps (e.g., sender timestamp 311). A receiver host (e.g., receiver host 130) receives 604 the data flow and applies receiver timestamps (e.g., receiver timestamp 321). Netcam activity then occurs. As described above, the netcam activity may occur at the sender host(s) (e.g., by receiving ACK packets indicating receiver timestamps and using netcam modules to compute one-way delay), at receiver hosts (e.g., where sender timestamps are included in the data flow and netcam modules compute one-way delay therefrom), at netcam system 140, or some combination thereof.

The netcam determines 606 one-way delay of data packets in data flows. As explained above, the one-way delay computation may depend on a priority of the data flow, and thus different data flows may have different one-way delay thresholds ("priority thresholds"). One-way delay may be determined from packets generally, and/or may be aggregated with dwell time to form a shadow buffer one-way delay. The netcam compares 608 the determined one-way delay (or delays, in the case where shadow buffer one-way delay is used) to the respective priority threshold. Responsive to determining 610 that the one-way delay is greater than the threshold for a given priority data flow, anomaly function is initiated. As depicted in FIG. 6, some anomaly function may include one or more of pausing 612 transmission of the data flow associated with the given priority and/or storing 614 the buffered data flow associated with the given priority (e.g., for forensic analysis). As described above, the pause time may vary depending on the priority level of the paused data flow.

Figure 7:
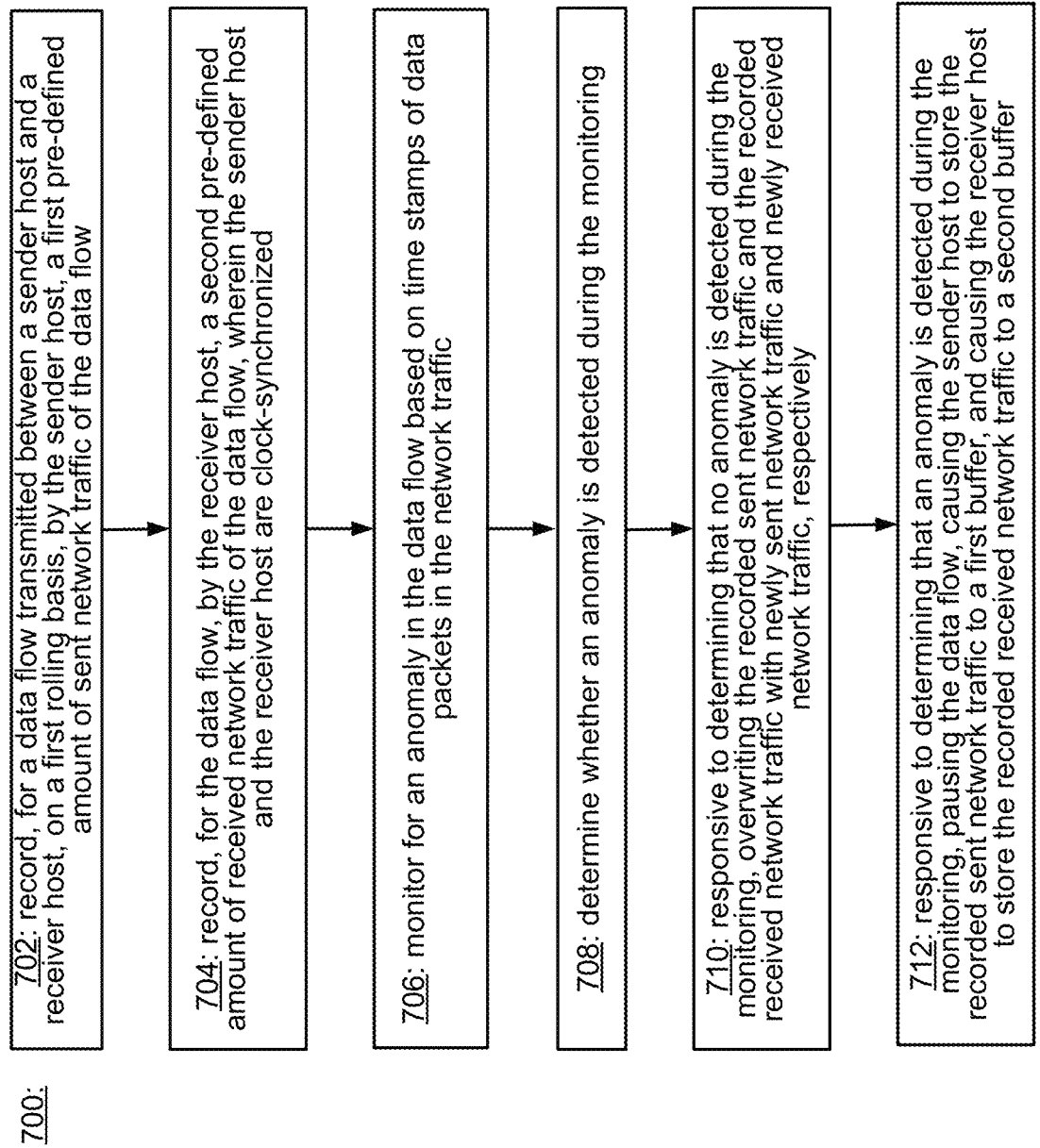
FIG. 7 is a flowchart that illustrates an exemplary process for performing netcam activities, according to an embodiment of the disclosure.

FIG. 7 is a flowchart that illustrates an exemplary process for performing netcam activities, according to an embodiment of the disclosure. Process 700 may be executed by one or more processors (e.g., based on computer-readable instructions to perform the operations stored in a non-transitory computer-readable memory). For example, netcam modules 113, 133, and/or netcam system 140 may execute some or all of the instructions to perform process 700. Process 700 is described with respect to netcam module 113 for convenience, but may be executed by any other netcam module and/or system.

Process 700 begins with, for a data flow transmitted between a sender host (e.g., sender host 110) and a receiver host (e.g., receiver host 130), recording 702, on a first rolling basis, by the sender host, a first pre-defined amount of sent network traffic of the data flow (e.g., recording to buffer 111) and recording 704, on a second rolling basis, by the receiver host, a second pre-defined amount of received network traffic of the data flow (e.g., recording to buffer 131), wherein the sender host and the receiver host are clock-synchronized (e.g., using a reference clock of clock synchronization system 141.

Netcam module 113 monitors 706 for an anomaly in the data flow based on time stamps of data packets in the network traffic (e.g., by subtracting sender timestamp 311 from receiver timestamp 321 and comparing the result to a one-way delay threshold). Netcam module 113 determines 708 whether an anomaly is detected during the monitoring (e.g., based on whether the comparison shows the one-way delay to be greater than the threshold). Responsive to determining that no anomaly is detected during the monitoring, netcam module 133 may passively allow an overwriting 710 of the recorded sent network traffic and the recorded received network traffic with newly sent network traffic and newly received network traffic, respectively (e.g., recording the latest network traffic over the oldest recorded data packet(s) and going on to repeat elements 702-708). Responsive to determining that an anomaly is detected during the monitoring, netcam module 113 pauses 712 the data flow, causes the sender host to store the recorded sent network traffic to a first buffer, and causes the receiver host to store the recorded received network traffic to a second buffer.

Figure 8:
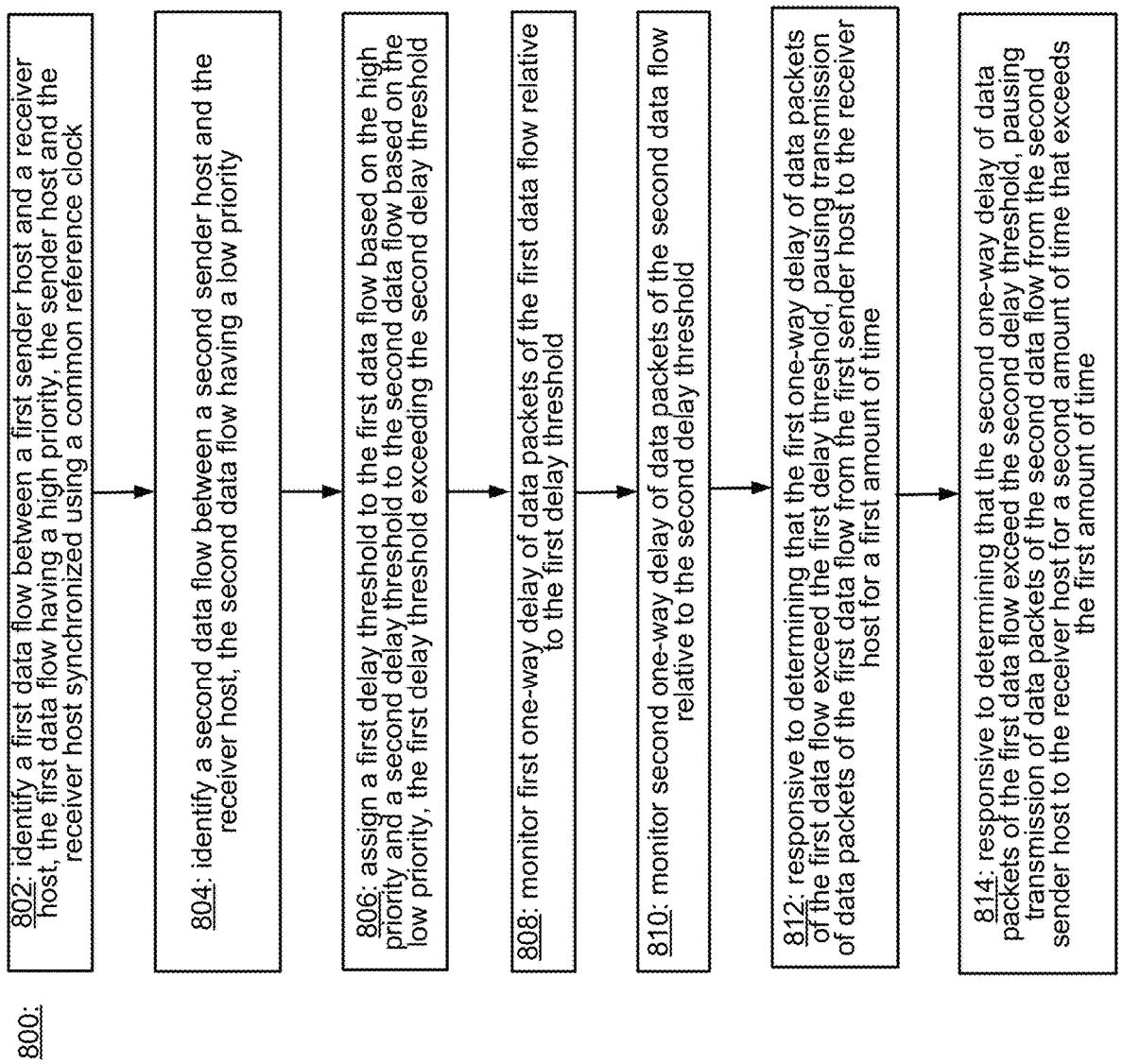
FIG. 8 is a flowchart that illustrates an exemplary process for performing netcam activities in a multiple priority scenario, according to an embodiment of the disclosure.

FIG. 8 is a flowchart that illustrates an exemplary process for performing netcam activities in a multiple priority scenario, according to an embodiment of the disclosure. Process 800 may be executed by one or more processors (e.g., based on computer-readable instructions to perform the operations stored in a non-transitory computer-readable memory). For example, netcam modules 113, 133, and/or netcam system 140 may execute some or all of the instructions to perform process 800. Process 800 is described with respect to netcam module 113 for convenience, but may be executed by any other netcam module and/or system.

Process 800 begins with netcam module 113 identifying 802 a first data flow between a first sender host (e.g., sender host 110) and a receiver host (e.g., receiver host 130), the first data flow having a high priority (e.g., high priority data flow 511), the sender host and the receiver host synchronized using a common reference clock. Netcam module 113 (e.g., of a different sender host or a same sender host as sender host 110) identifies 804 a second data flow between a second sender host and the receiver host (e.g., low priority data flow 531), the second data flow having a low priority, where the second sender host may be the same or a different host as the first sender host.

Netcam module 113 assigns 806 a first delay threshold to the first data flow based on the high priority and a second delay threshold to the second data flow based on the low priority, the first delay threshold exceeding the second delay threshold. Netcam module 113 monitors 808 first one-way delay of data packets of the first data flow relative to the first delay threshold, and monitors 810 second one-way delay of data packets of the second data flow relative to the second delay threshold. Responsive to determining that the first one-way delay of data packets of the first data flow exceed the first delay threshold, netcam module 113 pauses 812 transmission of data packets of the first data flow from the first sender host to the receiver host for a first amount of time. Responsive to determining that the second one-way delay of data packets of the first data flow exceed the second delay threshold, netcam module 113 pauses 814 transmission of data packets of the second data flow from the second sender host to the receiver host for a second amount of time that exceeds the first amount of time.

Figure 9:
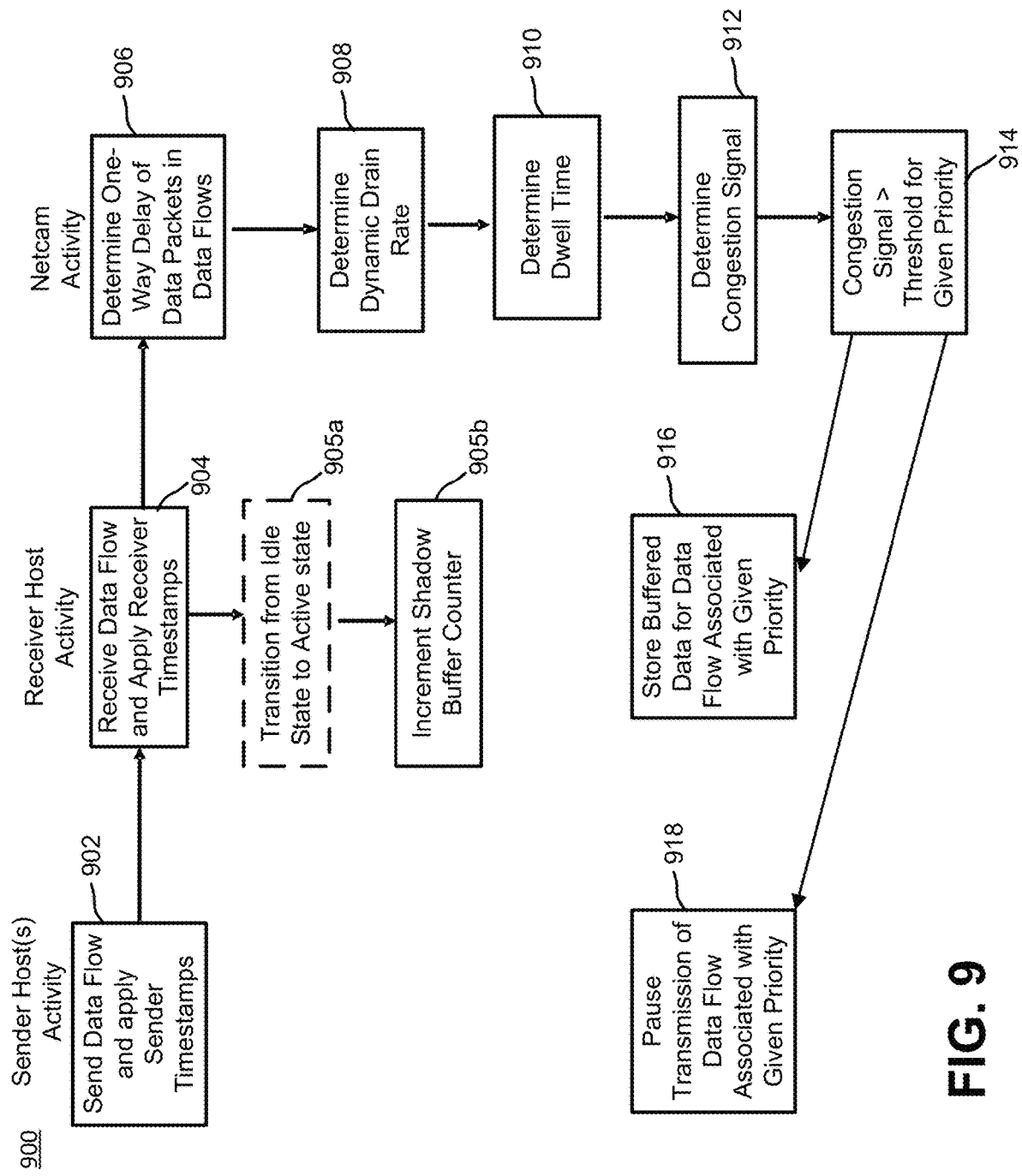
FIG. 9 is a data flow diagram showing netcam activities where shadow buffer considerations are depicted, according to an embodiment of the disclosure.

FIG. 9 is a data flow diagram showing netcam activities where shadow buffer considerations are depicted, according to an embodiment of the disclosure. Data flow 900 begins with a sender host sending 902 a data flow and applying sender timestamps, and a receiver host receiving 904 the data flow and applying receiver timestamps. These activities are performed in the manner described above with respect to elements 602 and 604 of FIG. 6. As mentioned with respect to FIG. 1, in an embodiment, the receiver host maintains both one or more regular buffers and one or more shadow buffers, where a regular buffer stores data packets as they are received, and a shadow buffer maintains a counter that ticks up as data packets are received and drains according to a dynamic drain rate (that is, decrements according to the dynamic drain rate over each unit of time). Different shadow buffers may be used for different data flows on a same receiver host, and the different data flows may have different priorities.

A shadow buffer may be in an idle state or an active state. Netcam module 133 of receiver host 130 may determine a shadow buffer to be in an active state responsive to receiving traffic of a data flow (that is, a shadow buffer for that data flow transitions from an idle state to an active state). Netcam module 133 may determine a shadow buffer to be in an idle state responsive to determining that the traffic is no longer received. For example, traffic may be deemed to be no longer received for a data flow where at least a threshold amount of time has passed since a last packet of the data flow was received. As another example, where traffic is consistently received for a data flow on a packet-by-packet basis over each unit of time, and a unit of time passes where a packet is not received for the data flow, netcam module 133 may determine that the traffic is no longer received. Thus, netcam module 133 may continue toggling a state of a shadow buffer for a data flow from idle to active and back depending on whether traffic is received for a data flow. As will be described further below, the state of the shadow buffer is used by netcam module 133 to determine other attributes relating to the shadow buffer, such as drain rate.

Assuming that the shadow buffer was idle, responsive to receiving a first packet of the data flow in 904, netcam module 133 transitions 905a the shadow buffer from an idle state to an active state, and increments 905b a counter of the shadow buffer that indicates a unit of data traffic received. Where the shadow buffer is already in an active state, 905a is not performed, but 905b continues as each unit of traffic (e.g., packet) is received. In an embodiment, netcam module 133 increments the counter by multiplying the unit of data traffic received by a factor. For example, for every packet received, the counter may be incremented by multiplying the unit by a number greater than 1 (e.g., 1.01, or 1.1). As a particular example where there are multiple priorities, if a packet is received, the shadow buffer may be multiplied by 1.01 if it is a high priority flow, or by 1.1 if it is a low priority flow. The higher the factor, the more quickly the shadow buffer counter will have a number that exceeds a threshold reflecting an anomaly (e.g., a scenario that merits pausing traffic and/or performing remedial measures).

The netcam (that is, either netcam system 140 or netcam module 133, or some distributed processing) performs the netcam activity depicted in the right-most column of FIG. 9. For convenience, the activity will be referenced as performed netcam module 133, but distributed or entire processing by netcam system 140 is equally possible.

Netcam module 133 determines 906 a one-way delay of data packets for each data flow, and determines 908 a dynamic drain rate for each shadow buffer corresponding to each respective data flow. While 906 and 908 are depicted sequentially in FIG. 9, these may be performed in parallel with one another or in an opposite order from what is depicted. Element 906 may occur at any point between where it is depicted in FIG. 9 up until the occurrence of 914. Element 906 may be performed in the same manner described above with respect to 606 of FIG. 6.

Netcam module 133 may determine the dynamic drain dynamic drain rate based on a number of units of the data removed from the regular buffer per unit of time while the shadow buffer is in the active state. That is, if three bytes are removed from the regular buffer for transmission to a next node in a data flow per microsecond, then the rate of 3 per microsecond is a basis from which the dynamic drain rate is determined, multiplied by a factor less than 1 (e.g., 0.9 or 0.95) such that drain from the shadow buffer occurs more slowly than drain from the regular buffer. The reason to decrement the shadow buffer at a slower rate than the regular buffer is, again, to ensure that where an anomaly might occur on the regular buffer, it is first detected using the shadow buffer. Netcam module 133 may select a factor to multiply by the drain rate based on priority of data flow, where high priority data flows have higher drain rates (e.g., 0.95-0.99), where medium and low priority data flows have lower drain rates (e.g., 0.9-0.94 for medium and 0.85-0.89 for low).

Netcam module 133 may determine the dynamic drain rate on any cadence, such as each time a data packet is received by receiver host 130, or on a slower cadence, such as for every Nth data packet received in a given data flow. Netcam module 133 may limit performance of determining 908 the dynamic drain rate to scenarios where the shadow buffer is in an active state. Where the shadow buffer is in an idle state, netcam module 133 may render a last determined dynamic drain rate as a static drain rate to use over time to decrement the shadow buffer until such a time that the shadow buffer re-enters an active state, whereafter netcam module 133 may recalculate a new dynamic drain rate.

The dynamic drain rate is used by netcam module 133 for two purposes. First, the dynamic drain rate is used to decrement the shadow buffer counter over time. Second, the dynamic drain rate is used to calculate a "dwell time." The term dwell time, as used herein, refers to a value that may be aggregated with the actual one-way delay of packets on a data flow as a congestion signal for determining whether there is an anomaly in the data flow that requires remedial measures to be taken.

Netcam module 133 determines 910 the dwell time as a function of the counter of the shadow buffer (e.g., which is a proxy of a length of the regular buffer with some added length based on the incremental and drain multiplier factors) and the dynamic drain rate. In an embodiment, netcam module 133 calculates the dwell time by dividing a value of the counter of the shadow buffer by the dynamic drain rate.

Netcam module 133 determines 912 a congestion signal for the data flow based on the dwell time. In an embodiment, netcam module 133 determines the congestion signal by mathematically aggregating a one way delay between the sender host and the receiver host with the dwell time. Similar to calculating the dynamic drain rate and incrementing the counter, netcam module 133 may weight the dwell time by a factor. For example, the dwell time may be weighted depending on priority of a data flow, where a larger multiplier may be used for lower priority data flows, and a smaller multiplier may be used for higher priority data flows (e.g., 1.01-1.05 for a high priority data flow; 1.06-1.14 for a medium priority data flow; 1.15-1.30 for a low priority data flow). This, again, will cause higher priority data flows to be impacted less frequently than lower priority data flows that will more quickly have their congestion signal reach a threshold that triggers remedial action.

In a similar manner to FIG. 6's discussion of elements 610-614, netcam module 133 may determine 914 that the congestion signal exceeds a threshold (e.g., a priority-specific threshold, similar to that used for regular buffers), and may take remedial action. The remedial action may include storing 916 data or indications of data for the associated data flow, and/or pausing 918 transmission of the associated data flow.

Figure 10:
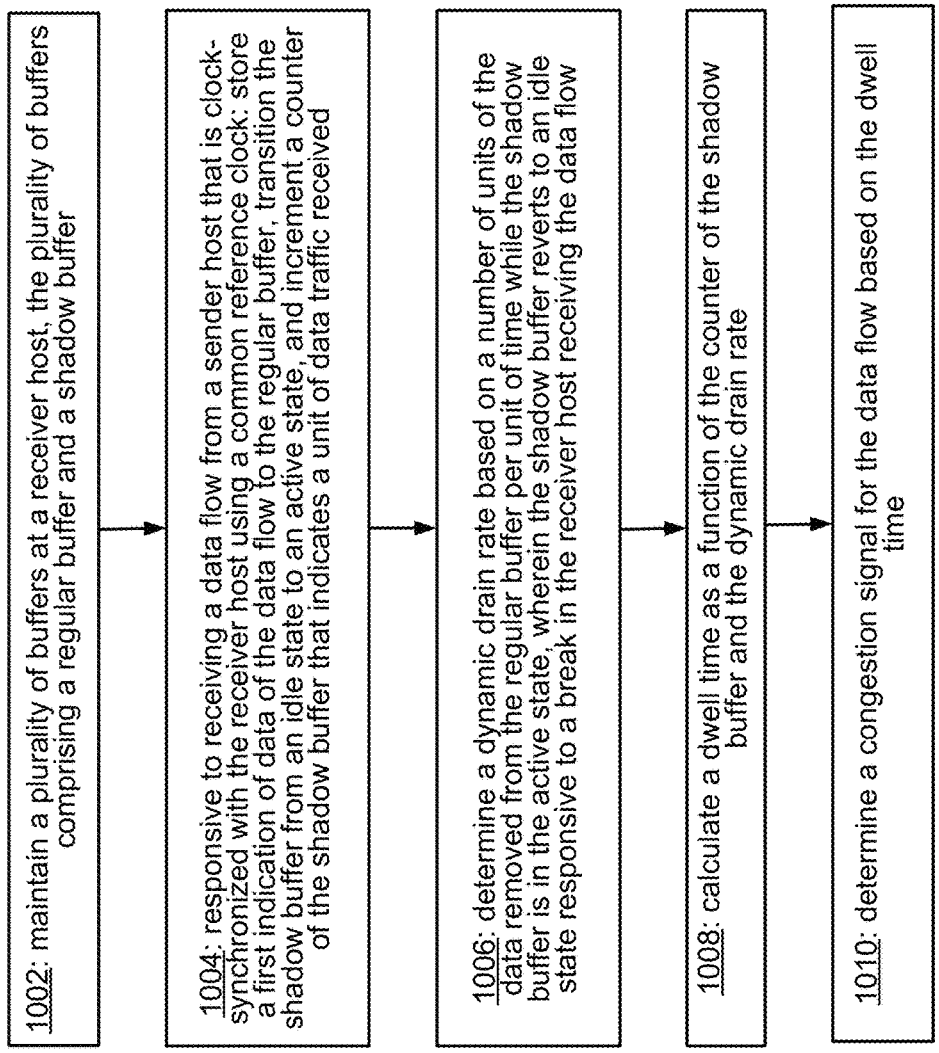
FIG. 10 is a flowchart that illustrates an exemplary process for performing netcam activities in coordination with shadow buffer considerations, according to an embodiment of the disclosure.

FIG. 10 is a flowchart that illustrates an exemplary process for performing netcam activities in coordination with shadow buffer considerations, according to an embodiment of the disclosure. Process 1000 may be executed by one or more processors (e.g., based on computer-readable instructions to perform the operations stored in a non-transitory computer-readable memory). For example, netcam modules 113, 133, and/or netcam system 140 may execute some or all of the instructions to perform process 1000. Process 1000 is described with respect to netcam module 133 for convenience, but may be executed by any other netcam module and/or system.

Process 1000 begins with netcam module 133 maintaining 1002 a plurality of buffers at a receiver host, the plurality of buffers comprising a regular buffer and a shadow buffer (e.g., buffer 131 and shadow buffer 134). Netcam module 133, responsive to receiving a data flow from a sender host that is clock-synchronized with the receiver host using a common reference clock, performs 1004: storing a first indication of data of the data flow to the regular buffer (e.g., storing a data packet or metadata corresponding to the data packet to buffer 131), transitioning the shadow buffer from an idle state to an active state (e.g., where this is the beginning of traffic in the data flow since a last break in traffic), and incrementing a counter of the shadow buffer that indicates a unit of data traffic received (e.g., counter of shadow buffer 134 that corresponds to the data flow).

Netcam module 133 determines 1006 a dynamic drain rate based on a number of units of the data removed from the regular buffer per unit of time while the shadow buffer is in the active state, where the shadow buffer reverts to an idle state responsive to a break in the receiver host receiving the data flow. Netcam module 133 calculates 1008 a dwell time as a function of the counter of the shadow buffer and the dynamic drain rate, and determines 1010 a congestion signal for the data flow based on the dwell time (e.g., the congestion signal used to detect an anomaly in the same manner described with respect to 708 of FIG. 7).

As mentioned in the foregoing, the embodiments described with respect to FIGS. 1-10 may not be fully efficient in scenarios where long links are deployed. For example, if during a pause (e.g., of 3.2 milliseconds), an MPLS network controller switches a path of the paused traffic link and the switched path has a different latency, then a pause (e.g., applied using element 612 of FIG. 6 or element 918 of FIG. 9) may be applied to a link for which it is not tuned, which creates bandwidth inefficiencies. Systems and methods are disclosed herein for a netcam module implementation that operates efficiently even in long-link scenarios.

Figure 11:
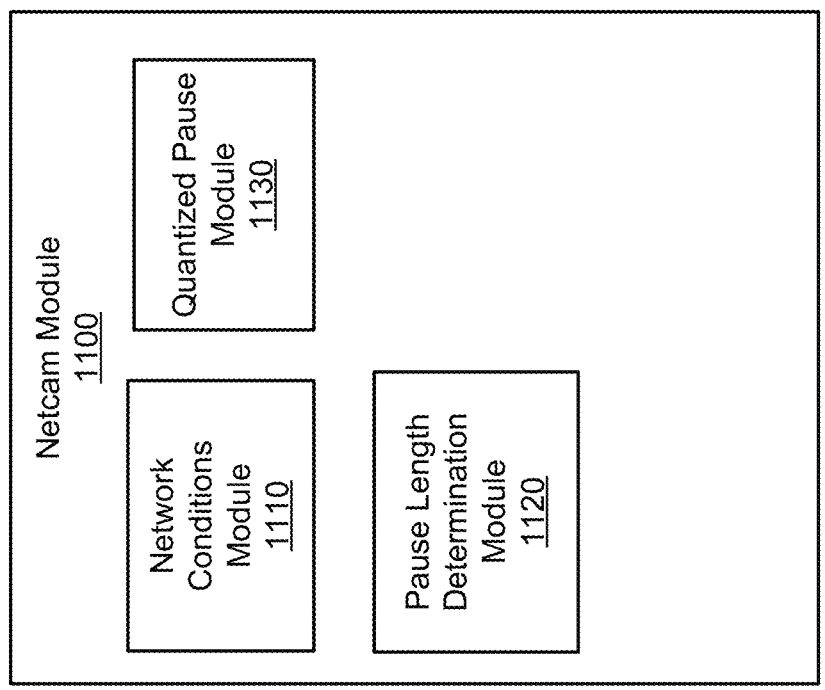
FIG. 11 illustrates exemplary sub-modules of a netcam module for use in a long-link environment, in accordance with an embodiment of the disclosure.

FIG. 11 illustrates exemplary sub-modules of a netcam module for use in a long-link environment, in accordance with an embodiment of the disclosure. As depicted in FIG. 11, netcam module 1100 includes network conditions module 1110, pause length determination module 1120, and quantized pause module 1130. Netcam module 1100 may be any netcam module, such as netcam module 113, netcam module 133, and/or a netcam module implemented by netcam system 140. Processing described as performed by netcam module 1100 may be distributed among any number of netcam modules and netcam system 140 as depicted in FIG. 1.

Network conditions module 1110 determines a set of conditions of the network between a sender host and a receiver host. The determination of network conditions is discussed at length in the foregoing (e.g., determining congestion on a path and/or for a data flow, bandwidth conditions, jitter, and so on; network conditions may also include a priority of a data flow transmitted through a network). As discussed in the foregoing, a shadow buffer may inform network conditions (e.g., by alerting to imminent congestion), and network conditions module 1110 may determine conditions based on this information informed from the shadow buffer.

Beyond determining congestion and the like, network conditions module 1110 may determine whether or not the link is a long link, as this may drive a decision by netcam module 1100 as to whether or not to deploy quantized pausing. To this end, network conditions module 1110 may determine a one-way delay of data traffic between the sender host and the receiver host (e.g., as described with respect to at least FIGS. 3 and 5). Network conditions module 1110 may determine whether the one-way delay exceeds a threshold one-way delay, and responsive to determining that the one-way delay exceeds the threshold one-way delay, network conditions module 1110 may determine that the link is a long link (e.g., which may cause netcam module 1100 to apply a series of quantized pauses rather than one discrete pause, as discussed below). Responsive to determining that the one-way delay does not exceed the threshold one-way delay, network conditions module 1110 may determine that the link is not a long link, and netcam module 1100 may therefore refrain from using quantized pauses. That is, netcam module 1100 may apply a length of pause is completely responsive to determining that the one-way delay does not exceed the threshold one-way delay.

Following a determination of the set of conditions, pause length determination module 1120 may determine a length of pause to apply to the traffic. Pause length may be determined by pause length determination module 1120 in any manner disclosed in the foregoing, such as being predefined by a user, defined based on data type, defined based on a priority of a data flow corresponding to the set of conditions of the network, and so on.

Figure 12:
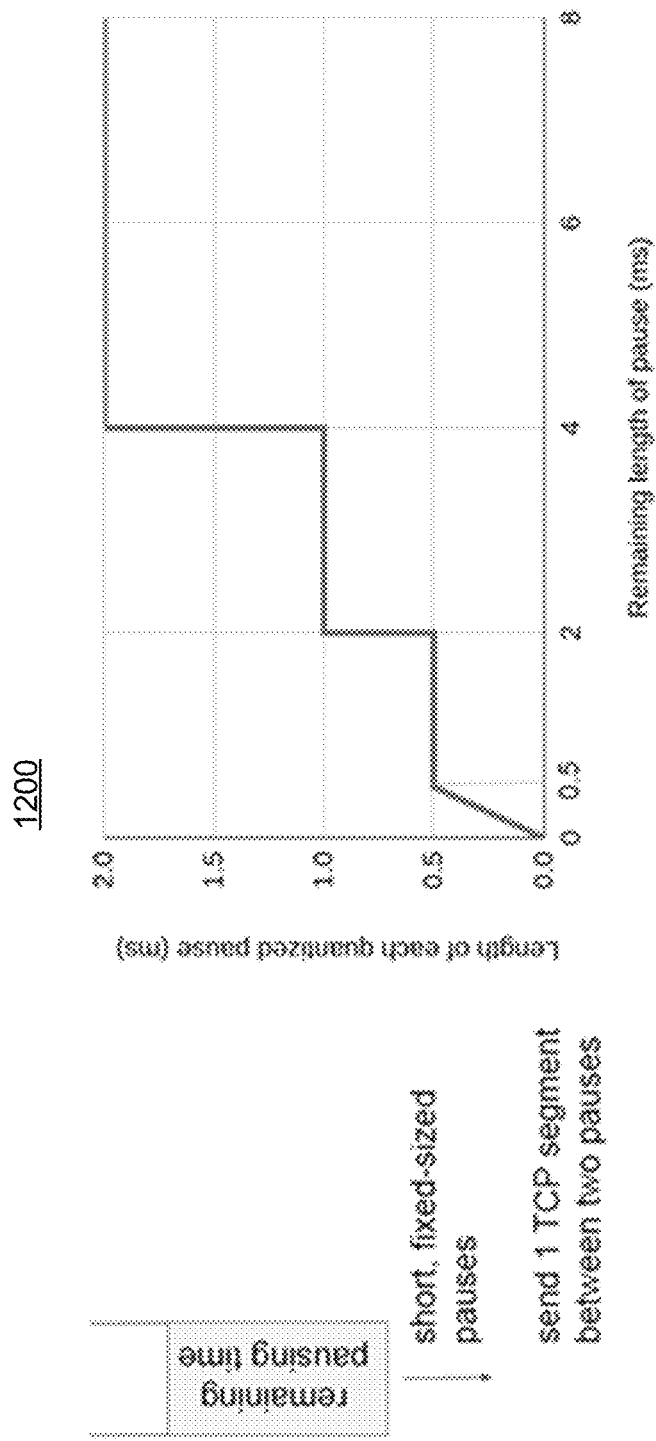
FIG. 12 illustrates a graphical depiction of an application for applying quantized pauses, in accordance with an embodiment of the disclosure.

Quantized Pause Module 1130 transmits the traffic using a series of quantized pauses. A unit of traffic may be transmitted between each quantized pause. Turning briefly to FIG. 12 to illustrate the quantized pause concept, FIG. 12 illustrates a graphical depiction of an application for applying quantized pauses, in accordance with an embodiment of the disclosure. As depicted in graph 1200, pause length determination module 1120 may determine if a length of pause is over 4 milliseconds, and may responsively determine that a next pause of the series of pauses for the length of pause will be for two milliseconds. Where the remaining length of pause is between 2 and 4 milliseconds, then a next pause of the series of pauses will be for 1 millisecond. Where the remaining length of pause is between 1 millisecond and 2 milliseconds, the next pause is to be for half a millisecond. Where the remaining length of pause is a half millisecond or less, then the remainder of the length of pause is applied.

Graph 1200 is merely exemplary, and any function may be applied that dictates how long a next segment of a length of pause should be. That is, graph 1200 represents a step function, where different lengths of quantized pause are applied depending on the remaining pause length. However, the step function is merely exemplary; any function for determining a quantized pause length may be used, such as a linear function, an exponential function, a logarithmic function, a quadratic function, a decay function, and so on.

As depicted in graph 1200, one TCP segment is sent between two quantized pauses. This is merely exemplary, and any unit of any type of traffic (whether TCP or otherwise, such as UDP) may be defined to be sent between quantized pauses. One unit of traffic may be defined to be any amount of traffic that is to be sent between quantized pauses. For example, one unit of traffic may be one data packet, ten data packets, or any number of data packets (or other forms of communication).

Applying these quantized pauses results in many benefits. As one benefit, network control functions will have reduced sensitivity on minimal one-way delay (OWD). For example, to achieve good control, for network controllers operating with the schema described with respect to FIGS. 1-10, OWD threshold needs to be higher than and close to the minimum OWD. However, in long-distance links, the min OWD may fluctuate due to wavelength changes (e.g., triggered by Multiprotocol Label Switching (MPLS)) in optical fibers. In scenarios where the minimum OWD becomes higher than the OWD threshold, network controllers (e.g., described with respect to FIGS. 1-10) may over-pause and cause throughput loss. Thus, monitoring for and transitioning from those embodiments to those of FIGS. 11-13 where long-range links are used results in more efficient bandwidth usage Moreover, quantized pausing makes these network controllers insensitive to the relationship between min OWD and OWD threshold. Even in scenarios where the minimum OWD is higher, network controllers will not over-pause. Yet further, traffic burstiness is reduced when unpausing. Still further, more information may be conveyed by packet traces, in that a receiving node can analyze a gap between packets to determine if those packets are delayed (the gap is different from those pre-set values) or not. If they are delayed, the receiving node may determine that current throughput equals the bottleneck bandwidth.

Returning to FIG. 11, in order to determine a quantized pause length, quantized pause module 1130 compares the length of pause determined by pause length determination module 1120 to a threshold. The threshold may be determined by a step function, as described above. In some embodiments, rather than using a threshold, a monotonic function or other function may be used. In the case of a step function, in response to determining that the length of pause exceeds the threshold, quantized pause module 1130 may instruct the sender host to pause the traffic for a first amount of time. In response to determining that the length of pause does not exceed the threshold, quantized pause module 1130 may instruct the sender host to pause the traffic for a second amount of time smaller than the first amount of time. To illustrate this, following from FIG. 12, the threshold may be 2 ms, where a quantized pause of 1 ms is selected if the pause length exceeds 2 ms, and where a quantized pause length of 0.5 ms is selected if the pause length does not exceed 2 ms.

In some embodiments, quantized pauses may be occurring in rapid succession, which causes a requirement that units of traffic be transmitted without delay. Moreover, because the quantized pauses are occurring on data flows that have congestion, other traffic, such as acknowledgments for receipt of a given unit of traffic, may be delayed. Thus, in some embodiments, following each given quantized pause of the series of quantized pauses, a next unit of traffic may be transmitted without reliance on receipt of an acknowledgement packet from the receiver host for a prior unit of traffic that was transmitted prior to the given pause. This ensures that each unit of traffic is timely transmitted according to the quantized pause schedule.

Quantized pause module 1130 may detect a new set of conditions of the network between the sender host and the receiver host, and may apply a new series of quantized pauses to transmission of the traffic based on a new length of pause determined from the new set of conditions. In some embodiments, quantized pause module 1130 may perform this detection by receiving an alert from network conditions module 1110 that the conditions have changed. The alert may be unsolicited by quantized pause module 1130. Alternatively, quantized pause module 1130 may request an alert when conditions change, and/or may expressly request a determination of conditions at certain trigger points (e.g., periodically, after a certain number of quantized pauses occur in a series, are at any other trigger points), and may receive the results of the determination at those times. Thus, quantized pause module 1130 may, before transmitting a quantized pause series for the full amount of a pause length, may cause a redetermination of the length of pause based on a redetermination of the set of conditions of the network (e.g., each time a predefined number of quantized pauses occur).

FIG. 13 is a flowchart that illustrates an exemplary process for deploying quantized pauses in connection with netcam activities on long-range links, in accordance with an embodiment of the disclosure. Process 1300 may be performed by one or more processors executing instructions that cause netcam module 1100 to perform operations. Process 1300 may begin with netcam module 1100 determining 1310 a set of conditions of the network between a sender host and a receiver host (e.g., using network conditions module 1110 to detect conditions between one or more sender hosts (e.g., 210, 220, 230, 310 etc.) and a receiver host (e.g., receiver host 200 and/or 320).

Netcam module 1100 may then determine 1320, from the set of conditions, a length of pause to apply to the traffic (e.g., using pause length determination module 1120). Netcam module 1100 may transmit 1330 the traffic until the length of pause is completely applied to the network using a series of quantized pauses (e.g., using quantized pause module 1130). This may be performed by comparing the length of pause to a threshold, in response to determining that the length of pause exceeds the threshold, instructing the sender host to pause the traffic for a first amount of time, and in response to determining that the length of pause does not exceed the threshold, instructing the sender host to pause the traffic for a second amount of time smaller than the first amount of time (e.g., using the step function described in graph 1200).

Netcam module 1100 may detect 1340 a new set of conditions of the network between the sender host and the receiver host (e.g., using network conditions module 1110), and may apply 1350 a new series of quantized pauses to transmission of the traffic based on a new length of pause determined from the new set of conditions (e.g., using quantized pause module 1130).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for reconciling configuration settings for imported resources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for controlling traffic of a network comprising:
    determining a set of conditions of the network between a sender host and a receiver host;
    determining, from the set of conditions, a length of pause to apply to the traffic;
    transmitting the traffic until the length of pause is completely applied to the network using a series of quantized pauses by:
        comparing the length of pause to a threshold;
        in response to determining that the length of pause exceeds the threshold, instructing the sender host to pause the traffic for a first amount of time; and
        in response to determining that the length of pause does not exceed the threshold, instructing the sender host to pause the traffic for a second amount of time smaller than the first amount of time, wherein
        between each quantized pause of the series of pauses, a unit of the traffic is transmitted, the unit including a same amount of data to be transmitted after each quantized pause before a next pause;
    detecting a new set of conditions of the network between the sender host and the receiver host; and
    applying a new series of quantized pauses to transmission of the traffic based on a new length of pause determined from the new set of conditions.

2. The method of claim 1, wherein, following each given quantized pause of the series of quantized pauses, a next unit of traffic is transmitted without reliance on receipt of an acknowledgement packet from the receiver host for a prior unit of traffic that was transmitted prior to the given pause.

3. The method of claim 1, further comprising, after a given quantized pause of the series of quantized pauses, redetermining the length of pause based on a redetermination of the set of conditions of the network.

4. The method of claim 1, wherein the set of conditions of the network is informed by a shadow buffer of the receiver host.

5. The method of claim 1, wherein the length of pause is determined based on a priority of a data flow corresponding to the set of conditions of the network.

6. The method of claim 1, further comprising:
    determining a one-way delay of data traffic between the sender host and the receiver host;
    determining whether the one-way delay exceeds a threshold one-way delay; and
    responsive to determining that the one-way delay exceeds the threshold one-way delay, applying the series of quantized pauses.

7. The method of claim 6, wherein the length of pause is completely applied using one pause responsive to determining that the one-way delay does not exceed the threshold one-way delay.

8. A non-transitory computer-readable medium comprising memory with instructions encoded thereon for controlling traffic of a network, the instructions, when executed by one or more processors, causing the one or more processors to perform operations, the instructions comprising instructions to:
    determine a set of conditions of the network between a sender host and a receiver host;
    determine, from the set of conditions, a length of pause to apply to the traffic;
    transmit the traffic until the length of pause is completely applied to the network using a series of quantized pauses by:
        comparing the length of pause to a threshold;
        in response to determining that the length of pause exceeds the threshold, instructing the sender host to pause the traffic for a first amount of time; and
        in response to determining that the length of pause does not exceed the threshold, instructing the sender host to pause the traffic for a second amount of time smaller than the first amount of time, wherein
        between each quantized pause of the series of pauses, a unit of the traffic is transmitted, the unit including a same amount of data to be transmitted after each quantized pause before a next pause;
    detect a new set of conditions of the network between the sender host and the receiver host; and
    apply a new series of quantized pauses to transmission of the traffic based on a new length of pause determined from the new set of conditions.

9. The non-transitory computer-readable medium of claim 8, wherein, following each given quantized pause of the series of quantized pauses, a next unit of traffic is transmitted without reliance on receipt of an acknowledgement packet from the receiver host for a prior unit of traffic that was transmitted prior to the given pause.

10. The non-transitory computer-readable medium of claim 8, the instructions further comprising instructions to, after a given quantized pause of the series of quantized pauses, redetermine the length of pause based on a redetermination of the set of conditions of the network.

11. The non-transitory computer-readable medium of claim 8, wherein the set of conditions of the network is informed by a shadow buffer of the receiver host.

12. The non-transitory computer-readable medium of claim 8, wherein the length of pause is determined based on a priority of a data flow corresponding to the set of conditions of the network.

13. The non-transitory computer-readable medium of claim 8, the instructions further comprising instructions to:
    determine a one-way delay of data traffic between the sender host and the receiver host;
    determine whether the one-way delay exceeds a threshold one-way delay; and
    responsive to determining that the one-way delay exceeds the threshold one-way delay, apply the series of quantized pauses.

14. The non-transitory computer-readable medium of claim 13, wherein the length of pause is completely applied using one pause responsive to determining that the one-way delay does not exceed the threshold one-way delay.

15. A system for controlling traffic of a network, the system comprising:
    memory with instructions encoded thereon; and
    one or more processors that, when executing the instructions, are caused to perform operations comprising:
        determining a set of conditions of the network between a sender host and a receiver host;
        determining, from the set of conditions, a length of pause to apply to the traffic;
        transmitting the traffic until the length of pause is completely applied to the network using a series of quantized pauses by:

comparing the length of pause to a threshold;

in response to determining that the length of pause exceeds the threshold, instructing the sender host to pause the traffic for a first amount of time; and in response to determining that the length of pause does not exceed the threshold, instructing the sender host to pause the traffic for a second amount of time smaller than the first amount of time, wherein between each quantized pause of the series of pauses, a unit of the traffic is transmitted, the unit including a same amount of data to be transmitted after each quantized pause before a next pause;

detecting a new set of conditions of the network between the sender host and the receiver host; and applying a new series of quantized pauses to transmission of the traffic based on a new length of pause determined from the new set of conditions.

16. The system of claim 15, wherein, following each given quantized pause of the series of quantized pauses, a next unit of traffic is transmitted without reliance on receipt of an acknowledgement packet from the receiver host for a prior unit of traffic that was transmitted prior to the given pause.

17. The system of claim 15, the operations further comprising, after a given quantized pause of the series of quantized pauses, redetermining the length of pause based on a redetermination of the set of conditions of the network.

* * * * *